(12) United States Patent
Platner

(10) Patent No.: US 7,665,746 B2
(45) Date of Patent: Feb. 23, 2010

(54) METHOD OF MOUNTING A KING PIN AT AN END OF A HOLLOW AXLE

(75) Inventor: David K. Platner, Shelby, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 534 days.

(21) Appl. No.: 11/340,290

(22) Filed: Jan. 26, 2006

(65) Prior Publication Data

US 2007/0170678 A1 Jul. 26, 2007

(51) Int. Cl.
*B62D 7/18* (2006.01)
(52) U.S. Cl. .............................. 280/93.512; 301/124.1
(58) Field of Classification Search ............ 280/93.512; 301/124.1
See application file for complete search history.

(56) References Cited

U.S. PATENT DOCUMENTS

| | | | | |
|---|---|---|---|---|
| 3,288,485 A | * | 11/1966 | White et al. ........... | 280/93.512 |
| 3,804,467 A | * | 4/1974 | Austermann ................ | 301/127 |
| 4,229,017 A | * | 10/1980 | Hagedorn .............. | 280/93.512 |
| 4,243,339 A | * | 1/1981 | Dickerson ...................... | 403/4 |
| 5,350,183 A | * | 9/1994 | Shealy .................. | 280/93.512 |
| 5,709,399 A | * | 1/1998 | Smith, Jr. ............... | 280/93.512 |
| 5,810,377 A | * | 9/1998 | Keeler et al. ........... | 280/93.512 |
| 6,416,136 B1 | * | 7/2002 | Smith ......................... | 301/128 |
| 6,616,156 B1 | * | 9/2003 | Dudding et al. ........ | 280/93.512 |

* cited by examiner

*Primary Examiner*—Paul N. Dickson
*Assistant Examiner*—George D. Spisich
(74) *Attorney, Agent, or Firm*—Carlson, Gaskey & Olds

(57) ABSTRACT

A king pin is mounted in a hollow axle. An insert is force fit into each end of the hollow axle. The insert includes an aperture that aligns with an aperture in a wall of the hollow axle to provide a mount structure for the king pin. This mount structure thus provides a solid and reliable mount in a very simplified manner. The hollow axle and insert are also provided with draw key holes such that bolts may lock the king pin within the insert and the hollow axle.

22 Claims, 1 Drawing Sheet

METHOD OF MOUNTING A KING PIN AT AN END OF A HOLLOW AXLE

BACKGROUND OF THE INVENTION

This application relates to the use of a solid insert plug at an end of a hollow axle to provide a mount location for a king pin.

Hollow axles are known, and are utilized in vehicles to provide various benefits. The hollow axle provides a lightweight alternative to solid axles.

One challenge with a hollow axle is the provision of components at the end of the axle that are to be mounted to the axle. As an example, king pins are typically mounted at the end of axles for heavy vehicles, and provide a pivot axis for steering associated wheels.

One family of methods of forming hollow axles to have structure at their ends is disclosed in co-pending U.S. application Ser. No. 10/056,945. This application, invented by the inventor of the present application, discloses a family of methods of forming axles, and for attaching structure at the end of the axles. Among the structures that may be attached are various king pin mount structures.

Some of these methods may be cumbersome, and somewhat difficult to achieve in production. Thus, a simpler manner of providing a mount location for a king pin would be desirable.

SUMMARY OF THE INVENTION

A hollow formed axle is provided with a plug insert at each of its two ends. The plug insert has a hole, as do outer walls of the hollow formed axle. A king pin is inserted through these holes. Other holes receive draw keys (bolts) to lock the king pin within the plug insert and hollow formed axle. By providing this insert with aligned holes, the present invention provides a relatively simple manner of attaching a king pin mount structure to a hollow axle, without unduly complicating the manufacture of the hollow axle.

These and other features of the present invention can be best understood from the following specification and drawings, the following of which is a brief description.

DETAILED DESCRIPTION OF THE PREFERRED EMBODIMENT

Figure 1:
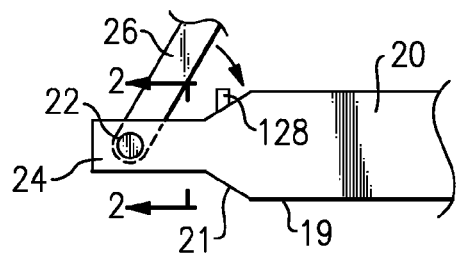
FIG. 1 is a highly schematic view of an axle mounting a steering knuckle assembly.

A steer axle 20 is illustrated in FIG. 1 that mounts a king pin 22 at an end section 24. The steer axle 20 is preferably formed as a hollow axle from a tubular or other shaped component. As shown, steer axle 20 has a first relatively large dimension section 19, angled sections 21, and then the smaller end section 24. A steering knuckle 26 is mounted on the king pin 22, as known. The steering knuckle 26 turns with an associated vehicle wheel, as known. A stop pin 128 is mounted in a side face of the axle 20 and serves as a stop for the steering knuckle 26 to limit the range of rotation.

Figure 2:
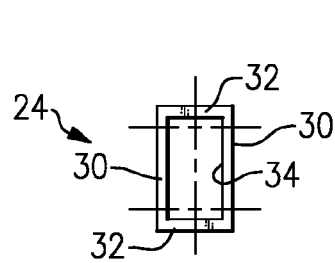
FIG. 2 is an end view along line 2-2 of FIG. 1.

As shown in FIG. 2, the end section 24 preferably has a rectangular shape with top and bottom walls 32 and side walls 30. Inner periphery 34 is defined by the top and bottom walls 32 and the side walls 30.

Preferably, the end section 24 is formed on a mandrel and may be drawn or formed over the mandrel. A tube may be used as a starting point for forming the steer axle 20. The tube may be seamless, seam welded or formed of some other tube forming technique.

Figure 3:
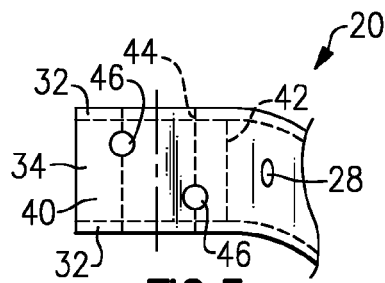
FIG. 3 is a side view of the axle of FIG. 1.

FIG. 3 is a side view of the steer axle 20. As shown, an insert 40 is force fit into end section 24 of the steer axle 20, and extends to an inner extent 42. It should be understood that a similar end section 24 and insert 40 is found on an opposed end of the steer axle 20 (i.e., to the right of FIG. 1). As also shown in FIG. 3, a hole 44 extends through the top and bottom walls 32, and through the insert 40 (hole 144, see FIG. 5A). Further, draw key holes 46 extend through the side walls 30 and the insert 40 (draw key holes 146, see FIG. 5A). Also shown, an aperture 28 in one of the side wall 30 of the steer axle 20 will receive the stop pin 128.

Figure 4:
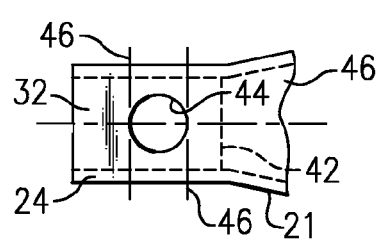
FIG. 4 is a top view of FIG. 1.

As can be appreciated from FIG. 4, the top wall 32 has the hole 44 extending therethrough. The draw key holes 46 are shown as lines in this figure.

Figure 5A:
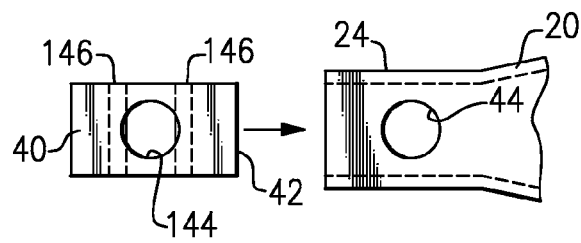
FIG. 5A is a first step in the manufacture of the inventive axle.

As shown in FIG. 5A, the end section 24 of the steer axle 20 is initially formed as a hollow part. Any manner of manufacturing the steer axle 20, such as those disclosed in the above-referenced co-pending United States application may be utilized. The insert 40 is then inserted into the end section 24. The hole 144 in the insert 40 is aligned with the hole 44 in the end section 24. The hole 144 in the insert 40 comprises a king pin hole that receives the king pin 22. As can be appreciated from FIG. 5A, the insert 40 also has the draw key holes 146 extending transversely to an axis of the hole 144, and which at least partially intersect the hole 144. The draw key holes 146 in the insert 40 comprise bolt holes for receiving bolts 246.

Figure 5B:
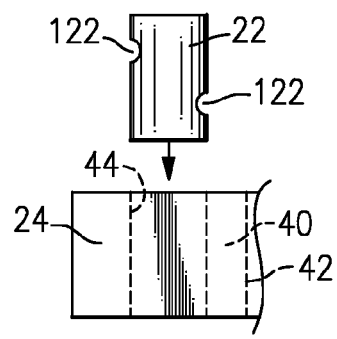
FIG. 5B shows a subsequent step.
Figure 5C:
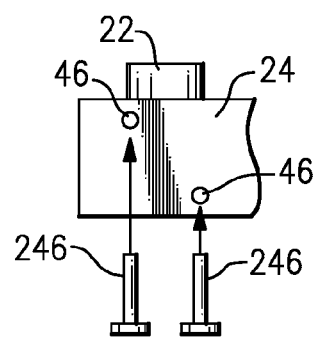
FIG. 5C shows yet another subsequent step.

As shown in FIG. 5B, the next step is to insert the king pin 22 into the holes 44 and 144. As can be appreciated, small notches 122 are formed in the king pin 22. As shown in FIG. 5C, once the king pin 22 is inserted into the holes 44 and 144, the bolts 246 may be inserted into the draw key holes 46, and also extend through the draw key holes 146 in the insert 40. As known, these bolts 246 catch within the notches 122, and thus lock the king pin 22 within the end section 24. The FIG. 5A steps and the FIGS. 5B and 5C steps could be performed at different locations.

In this manner, a method of securely mounting the king pin within the end of a hollow axle is provided. This method is much simpler to manufacture than prior methods, and provides valuable benefits.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A steer axle comprising:
    an axle body having a pair of spaced ends, said axle body being generally hollow at each of said pair of spaced ends;
    an insert inserted into at least one of said pair of spaced ends such that said insert is non-rotatable relative to said at least one of said pair of spaced ends;

an aperture formed within at least one wall of said at least one of said pair of spaced ends, and through at least a portion of said insert;
at least one draw key hole formed through said axle body and said insert; and
a king pin mounted within said aperture.

2. The steer axle as set forth in claim 1, wherein said aperture is formed through both of a top and bottom wall of said axle body, and entirely through said insert.

3. The steer axle as set forth in claim 1, wherein said at least one draw key hole intersects said aperture within said insert, and including a lock member inserted through said at least one draw key hole to lock said king pin within said aperture.

4. The steer axle as set forth in claim 3, wherein said at least one draw key hole comprises a pair of draw key holes each including one lock member.

5. The steer axle as set forth in claim 1, wherein each end of said pair of spaced ends includes said insert and king pin.

6. The steer axle as set forth in claim 1, wherein each spaced end includes a hollow section bounded by said at least one wall, and including a force fit interface between said insert and said at least one wall of said spaced end to attach said insert to said axle body such that said insert substantially fills said hollow section.

7. A method of forming a steer axle including the steps of:
(1) providing a hollow axle body having a pair of spaced ends, said hollow axle body being generally hollow at each of said pair of spaced ends;
(2) inserting an insert into each end of said pair of spaced ends such that said inserts are non-rotatable relative to said pair of spaced ends;
(3) providing an aperture within at least one wall at each end of said pair of spaced ends, and through at least a portion of each of said inserts; and
(4) forming at least one draw key hole through said hollow axle body and said insert at each end of said pair of spaced ends.

8. The method as set forth in claim 7, including forming said apertures through both of a top and bottom wall of the hollow axle body, and entirely through each of said inserts.

9. The method as set forth in claim 7, including inserting a king pin into each of said apertures.

10. The method as set forth in claim 9, wherein each draw key hole intersects said aperture within said insert, and including inserting a lock member through each of said draw key holes to lock said king pins within said apertures.

11. The method as set forth in claim 10, wherein said at least one draw key hole comprises a pair of draw key holes at each end, and including inserting a lock member through each draw key hole.

12. The method as set forth in claim 7, including force fitting said inserts into said pair of spaced ends such that each insert is fixed to said hollow axle body.

13. The method as set forth in claim 7, including substantially filling said hollow axle body at each of said pair of spaced ends with said inserts.

14. A steer axle comprising:
an axle body having a pair of spaced ends, said axle body being generally hollow at each of said pair of spaced ends;
an insert inserted into at least one of said pair of spaced ends such that said insert is non-rotatable relative to said at least one of said pair of spaced ends;
at least one draw key hole formed through said axle body and said insert; and
a king pin aperture formed within at least one wall of said at least one of said pair of spaced ends, and through at least a portion of said insert, said aperture to receive a king pin therein.

15. The steer axle as set forth in claim 14, wherein a king pin is mounted within said king pin aperture.

16. The steer axle as set forth in claim 15, wherein said king pin aperture is formed through both of a top and bottom wall of said axle body, and entirely through said insert.

17. The steer axle as set forth in claim 15, wherein said at least one draw key hole intersects said king pin aperture within said insert, and including a lock member inserted through said at least one draw key hole to lock said king pin within said king pin aperture.

18. The steer axle as set forth in claim 17, wherein said at least one draw key hole comprises a pair of draw key holes each including one lock member.

19. The steer axle as set forth in claim 14, wherein each end of said pair of spaced ends includes said insert and king pin.

20. The steer axle as set forth in claim 14, wherein each spaced end includes a hollow section bounded by said at least one wall and wherein said insert substantially fills said hollow section.

21. The steer axle as set forth in claim 14, including a force fit interface between said insert and said at least one wall of said spaced end such that said insert is attached to said axle body.

22. The steer axle as set forth in claim 14, wherein said axle body includes a large dimension section that transitions into a pair of spaced angled sections which then transition into said pair of spaced ends, and wherein said insert comprises a polygonal block that extends to an inner extent adjacent a transition between one spaced end and an associated angled section.

* * * * *

UNITED STATES PATENT AND TRADEMARK OFFICE
CERTIFICATE OF CORRECTION

PATENT NO. : 7,665,746 B2 Page 1 of 1
APPLICATION NO. : 11/340290
DATED : February 23, 2010
INVENTOR(S) : David K. Platner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this

Fourth Day of January, 2011

David J. Kappos
*Director of the United States Patent and Trademark Office*